United States Patent
Barthelmes et al.

(10) Patent No.: US 12,521,135 B2
(45) Date of Patent: Jan. 13, 2026

(54) SCREWDRIVING TOOL AND ASSEMBLY METHOD USING A SCREWDRIVING TOOL

(71) Applicant: Aesculap AG, Tuttlingen (DE)

(72) Inventors: Sven Barthelmes, Emmingen-Liptingen (DE); Pedro Morales, Tuttlingen (DE)

(73) Assignee: Aesculap AG, Tuttlingen (DE)

( * ) Notice: Subject to any disclaimer, the term of this patent is extended or adjusted under 35 U.S.C. 154(b) by 112 days.

(21) Appl. No.: 18/554,271

(22) PCT Filed: Apr. 6, 2022

(86) PCT No.: PCT/EP2022/059087
§ 371 (c)(1),
(2) Date: Oct. 6, 2023

(87) PCT Pub. No.: WO2022/218771
PCT Pub. Date: Oct. 20, 2022

(65) Prior Publication Data
US 2024/0188979 A1    Jun. 13, 2024

(30) Foreign Application Priority Data
Apr. 8, 2021   (DE) ............... 10 2021 108 716.3

(51) Int. Cl.
*A61B 17/28* (2006.01)
*A61B 17/00* (2006.01)

(52) U.S. Cl.
CPC *A61B 17/2816* (2013.01); *A61B 2017/00526* (2013.01)

(58) Field of Classification Search
CPC ..... B25B 13/486; B25B 13/485; B25B 13/48; B25B 13/00; B25B 21/00; B25B 15/00;
(Continued)

(56) References Cited

U.S. PATENT DOCUMENTS

| 2007/0157736 A1* | 7/2007 | Kawano | ............... B23P 19/065 73/761 |
| 2009/0229846 A1* | 9/2009 | Kawano | ............... B23P 19/065 173/217 |

(Continued)

FOREIGN PATENT DOCUMENTS

EP  2873381 A1  5/2015

OTHER PUBLICATIONS

Office Action received in Japanese Application No. 2023-561810 dated Mar. 13, 2025, with translation, 6 pages.
(Continued)

*Primary Examiner* — Lawrence Averick
(74) *Attorney, Agent, or Firm* — Christopher A. Rothe; CM Law (57) ABSTRACT

A screwdriving tool and an assembly method for screwing in a screw using the screwdriving tool. The screwdriving tool includes a first tool shaft with an end-side screw-engaging portion for transmitting a torque to the screw, and a second tool shaft that is orientable axially with respect to the first tool shaft and in an opposite direction, in such a way that an end-side screw-engaging portion of the second tool shaft lies axially opposite the end-side screw-engaging portion of the first tool shaft. The second tool shaft transmits a compressive force axially to the screw in a direction towards the first tool shaft.

8 Claims, 3 Drawing Sheets

(58) Field of Classification Search
CPC ............ B25B 27/0007; A61B 17/2816; A61B 2017/00526; A61B 17/28
See application file for complete search history.

(56) References Cited

U.S. PATENT DOCUMENTS

2011/0106065 A1* 5/2011 Tontarra ............. A61B 17/1606
606/1
2022/0371163 A1* 11/2022 Ward ..................... B25B 21/00

OTHER PUBLICATIONS

Search Report received in German Application No. 10 2021 108 716.3 dated Feb. 7, 2022, with translation, 13 pages.
Search Report received in International Application No. PCT/EP2022/059087 dated Jun. 21, 2022, with translation, 5 pages.
Written Opinion received in International Application No. PCT/EP2022/059087 dated Jun. 21, 2022, with translation, 11 pages.

* cited by examiner

SCREWDRIVING TOOL AND ASSEMBLY METHOD USING A SCREWDRIVING TOOL

CROSS-REFERENCE TO RELATED APPLICATIONS

This application is the United States national stage entry of International Application No. PCT/EP2022/059087, filed on Apr. 6, 2022, and claims priority to German Application No. 10 2021 108 716.3, filed on Apr. 8, 2021. The contents of International Application No. PCT/EP2022/059087 and German Application No. 10 2021 108 716.3 are incorporated by reference herein in their entireties.

FIELD

The present disclosure relates to a screwdriving tool for transmitting a torque to a screw. In addition, the present disclosure relates to an assembly method comprising a screwdriving tool, preferably this screwdriving tool.

BACKGROUND

For screwing a screw into an internal thread, for example in order to connect two branches of a medical instrument firmly to each other or in particular so that they can move relative to each other, for example pivotably, it is necessary to apply a torque to the screw. This torque can be transmitted to the screw in a form-fitting and/or force-fitting (i.e. frictionally engaged) manner, in particular, by a screwdriving tool. The torque transmitted to the screw by the screwdriving tool has to overcome a thread friction force acting between the screw and the internal thread.

Such a screwdriving tool is known, for example, from US 2009/0 229 846 A1. In addition, an assembly method for screwing in a screw is known, for example, from EP 2 873 381 A1.

For force-fit torque transmission, the screw is subjected to an axial pressure/an axial compression force by the screwdriving tool so that a surface friction force is created between the screwdriving tool and the screw, and a friction torque resulting from the surface friction force is transmitted to the screw when the screwdriving tool is rotated. If the friction torque between the screwdriving tool and the screw is smaller than the torque resulting from the thread friction force, the screwdriving tool slips and the screw is not screwed in. This can cause the screwdriving tool to slip and damage a surface of the screw or a component comprising an internal thread.

The higher the axial pressure applied to the screw by the screwdriving tool, the greater the surface friction force and the resulting friction torque that can be transmitted from the screwdriving tool to the screw. However, since the axial pressure applied to the screw also acts on the internal thread and the thread friction force therefore increases as the axial pressure increases, the axial pressure cannot simply be increased at will in order to increase the torque that can be transmitted from the screwdriving tool to the screw in a frictionally engaged manner.

SUMMARY

It is therefore the object of the present disclosure to provide a screwdriving tool with which a screw can be screwed in particularly easily and reliably. In addition, a suitable assembly method with a screwdriving tool, preferably this one, is to be provided.

More precisely, the screwdriving tool has a first tool shaft, preferably with a large shaft diameter, and a second tool shaft, preferably with a small shaft diameter. Here, the large or small shaft diameter is understood to mean that the shaft diameter of the first tool shaft is larger than the shaft diameter of the second tool shaft. Preferably, the large shaft diameter corresponds approximately to a diameter of the screw head, while the small shaft diameter preferably corresponds approximately to a diameter of a screw shaft or a core diameter of the screw or is smaller than the latter.

The first tool shaft has an end-side screw engagement portion/screw-head engagement portion which is provided and configured for transmitting a torque to a screw, in particular to a screw head of the screw. Preferably, the end-side screw engagement portion/screw-head engagement portion of the first tool shaft may be rotatable and provided and configured to transmit a compression force axially to the screw, in particular the screw head. Thus, the friction torque (between the first tool shaft and the screw) resulting from the compression force during rotation of the first tool shaft can be transmitted from the first tool shaft to the screw.

The second tool shaft has an end-side screw engagement portion/screw-shaft engagement portion, which is provided and configured to transmit a compression force axially to the screw, in particular to a screw end/screw-shaft end of the screw opposite the screw head. The second tool shaft is orientable or oriented axially to the first tool shaft and in the opposite direction thereto, such that its end-side screw engagement portion is axially opposite the end-side screw engagement portion of the first tool shaft and is provided and configured to transmit the compression force axially to the screw in the direction toward the first tool shaft.

In other words, the approximately punch-like first tool shaft and the approximately punch-like second tool shaft have a common longitudinal axis and are axially spaced from each other such that the screw engagement portion of the first tool shaft faces the screw engagement portion of the second tool shaft. Thus, the screw can be arranged longitudinally aligned between the first tool shaft and the second tool shaft. Furthermore, the second tool shaft is displaceable along its longitudinal axis toward the first tool shaft, so that the compression force acting axially toward the first tool shaft is transmittable to the screw, and thus from the screw to the first tool shaft. Consequently, a force acting between the screw engagement portion of the first tool shaft and the screw corresponds to a sum of the compression force that can be applied by the first tool shaft and the second tool shaft, each directed toward the opposite/opposed tool shaft.

Accordingly, the core of the disclosure is that the screwdriving tool is provided and configured in such a way that the screw can be clamped axially between the first tool shaft and the second tool shaft. This has the advantage that the axial pressure acting between the screwdriving tool and the screw can be increased while bypassing the internal thread (and avoiding a thread friction torque that is increased as a result). Simply put, the normal force on the surface of the screw, in particular the screw head, is increased, while the axial force acting on the screw (as a whole) in the direction of the second tool shaft remains the same or is compensated by the compression force of the second tool shaft.

In yet other words, the screwdriving tool according to the disclosure has two separate tool shafts (co-axial) extending axially to each other (on a common axis), a common tool-shaft support frame, on which the tool shafts are held (preferably rotatably) and can be moved toward each other in the axial direction in order to clamp a screw axially between them (closed force flow via the tool-shaft support frame, the two tool shafts and the screw clamped between them). The clamping force that can be applied axially to the tool shafts via the tool-shaft support frame (via a compression force device of the tool-shaft support frame) is preferably adjustable (manually or automatically) (e.g. via a pre-tensioning spring, hydraulic/pneumatic ram or a clamping screw) in such a way that a frictional force is generated between at least one screw head-side tool shaft (or its screw engagement portion) and the screw, which enables a specific screw-in torque (from the screw head-side tool shaft or both tool shafts) to be transmitted to the screw.

This has the advantage that the screw can be screwed in solely or at least predominantly by frictionally engaging force transmission with the screwdriving tool according to the application, giving freedom with regard to the design of the screw, in particular a shape of a screw head. In particular, the screw head can preferably be formed with a flat/unprofiled surface, so that essentially only frictional forces can act between the screw head and the (likewise preferably unprofiled/not producing a form fit) screw engagement portion of the screw head-side tool shaft, which in particular avoids disadvantages that arise due to an often angular outer or inner profile of the screw head necessary for form-fitting force transmission. Preferably, the screw head can be configured essentially rotationally symmetrically, thus avoiding the formation of crevices, slits, pockets or the like, from which tissue residues, dirt and body fluids cannot be reliably and completely removed during reprocessing of the instrument.

According to a preferred embodiment, the screw engagement portion of the first tool shaft may have a substantially concavely curved, in particular spherical (smooth/unprofiled) or frustoconical surface. The screw engagement portion of the first tool shaft can preferably be provided and configured such that the shape of the screw engagement portion substantially corresponds to the shape of the screw head. That is, the screw head preferably has a substantially convexly curved, in particular spherical (unprofiled) surface. Alternatively or additionally, according to a preferred embodiment, the screw engagement portion of the second tool shaft may have a substantially flat or concavely curved, in particular spherical (unprofiled) surface. The screw engagement portion of the second tool shaft can preferably be provided and configured such that the shape of the screw engagement portion corresponds to the shape of the screw end. This means that the screw end preferably has a substantially flat or convexly curved, in particular spherical surface. This allows the first tool shaft and/or the second tool shaft to be guided and centered in an advantageous manner. This means that self-centering preferably takes place during assembly or during the clamping process of the screw between the axially spaced tool shafts. A further advantage of the soft-edged/curved surface formation of the first tool shaft and/or second tool shaft is that damage can be avoided when the screwdriving tool slips off and thus any reworking of the screw, which is necessary to ensure the surface quality required for medical, in particular surgical, instruments/devices.

According to a preferred embodiment, the present disclosure relates to the screwdriving tool comprising a screw provided and configured to receive torque from the screw engagement portion of the first tool shaft and the compression force from the screw engagement portion of the second tool shaft. In particular, the screw may have a substantially spherical (or spherical segment-shaped) screw head.

According to a preferred embodiment, the screwdriving tool may have a tightening device (portion of the tool-shaft support frame/tool-shaft holding device for clamping a screw between the axially spaced tool shafts). The tightening device may preferably be provided and configured to set a rotation angle and/or torque of the screw engagement portion of the first tool shaft. Alternatively or additionally, the tightening device may preferably be provided and configured to measure a rotation angle and/or a torque of the screw engagement portion of the second tool shaft. Thus, it is possible to adjust how far and/or how tightly the screw is screwed in (into a medical instrument), i.e., which turn of the thread of the screw is in thread engagement and/or how large a section modulus is that results from the screw connection, in particular of two components of a surgical instrument movably/pivotably connected therethrough. I.e., the tightening device can be used in the manner of a slip clutch to prevent overtightening of the screw to be screwed in.

According to a preferred embodiment, the screwdriving tool may have a (previously indicated) compression force device (further portion of the tool-shaft support frame/tool-shaft holding device). The compression force device is preferably provided and configured to set, calculate and/or measure the compression force (from the second tool shaft axially toward the first tool shaft on the screw and/or from the first tool shaft axially toward the second tool shaft on the screw). In other words, the compression force device is preferably provided and configured to set, calculate and/or measure an axial clamping force of the screwdriving tool acting on the screw. In particular, the compression force device may be configured such that an axial distance between the first tool shaft and the second tool shaft is changeable/adjustable, for example via a screw drive, such as against the restoring force of a spring. Thus, the axial clamping force/axial compression force can be determined depending on the length of the screw to be clamped in the screwdriving tool. The compression force device may be actuatable manually or preferably automatically.

According to a preferred embodiment, the first tool shaft and the second tool shaft may be held axially movable relative to each other, preferably pivotably or axially shiftable. In this way, the screw-engagement portions can be moved toward and away from each other in a simple manner, for example in the manner of a press or pliers.

According to a preferred embodiment, the screw engagement portion of the first tool shaft may be spring pre-tensioned in the axial direction toward the second tool shaft. Alternatively or additionally, the screw engagement portion of the second tool shaft may be spring pre-tensioned in the axial direction toward the first tool shaft according to a preferred embodiment. This has the advantage that the spring pre-tension can be used to set a defined compression force that can be transmitted by the screw engagement portion, and thus also a defined tightening torque. In addition, damage to the screw due to excessive compression force can be avoided.

According to a preferred embodiment, the first tool shaft can be integrally connected to the second tool shaft rotatably about its longitudinal axis. This means that the second tool shaft co-rotates with the rotation of the first tool shaft. In this way, a torque for screwing in the screw can also be transmitted from the screw engagement portion of the second tool shaft to the screw.

According to an alternative preferred embodiment, the first tool shaft may be relatively rotatable relative to the second tool shaft about its longitudinal axis. This means that the second tool shaft is stationary/not rotating when the first tool shaft rotates. Thus, the second tool shaft serves only as a counterholder for applying the axial compression force.

Alternatively, the second tool shaft may be rotated about its longitudinal axis independently of the first tool shaft. In this way, torque can also be applied to the screw via the second tool shaft.

The object of the present disclosure is also solved by an assembly method for screwing a screw into an internal thread of a medical instrument having two branches, using a—preferably the described—screwdriving tool, in order to connect the two branches to each other by the screw in such a way that the two branches are pivotable with respect to each other about the screw as a hinge. The assembly method according to the invention comprises the following steps:

axially moving a first tool shaft and a second tool shaft of the screwdriving tool toward each other for clamping the screw between its screw head and its screw shaft in the screwdriving tool so that a compression force is transmitted axially from the second tool shaft to the screw in the direction toward the first tool shaft,     rotating the screwdriving tool, in particular the first and possibly the second tool shaft, relative to the instrument about a longitudinal screw axis in order to transmit a torque (in particular for setting a tightening torque or a screw-in depth of the screw) to the screw clamped in the screwdriving tool and to screw the screw into the internal thread, and     axially moving the first tool shaft and the second tool shaft apart to unclamp the screw from the screwdriving tool.

Additionally, a first branch of the two branches comprises a first through-hole and a second branch of the two branches comprises a second through-hole in which the internal thread is configured. According to a preferred embodiment of the assembly method, it comprises the following step:

axially moving the second tool shaft toward the first tool shaft and through the second through-hole before the screw is clamped into the screwdriving tool and inserted into the internal thread, or     passing the screw through the first through-hole and inserting the screw into the internal thread before moving the second tool shaft axially through the second through-hole toward the first tool shaft and clamping the screw in the screwdriving tool.

Accordingly, the screw can first be clamped into the screwdriving tool before it is inserted and screwed into the internal thread, or the screw can first be inserted into the internal thread before it is clamped and screwed into the screwdriving tool.

Preferably, the screw can be secured in its screwed-in position, for example by laser welding and/or by adhesive, which can be applied before clamping in the screwdriving tool.

In summary, it can be added that a cleaning-optimized connection element for surgical instruments is provided which solves the problem of tissue residues, dirt and body fluids collecting and adhering to a slit in the screw, which are not completely removed during the reprocessing process. Disadvantages of previous connection elements include the fact that the sharp-edged slit base and slits cannot be reliably cleaned, and that assembly errors that cannot be avoided in mass production, such as the slipping of a screwdriver, have to be reworked manually, for example by polishing. The object is therefore to enable a combination of the design of a connection element head with a suitable assembly method in which there are no deep pockets, slits or the like with sharp edges at the bottom and the tightening torques/assembly forces applied can be finely adjusted/dosed. The screw head and the threaded end may be spherical in shape, so that the spherical support guides the system and centers itself when the screw is clamped between its head and the threaded end during the assembly process. The force is transmitted by the frictional force applied via a tool. In this process, the tightening torque or the action or the section modulus of the movable parts can be sensitively adjusted and/or measured and/or logged via a sensor system. If necessary, the screw connection can be secured in this screw position via adhesive, a laser welding spot or the like. Since the screw head is formed without a slit or a similar element of force transmission (form-fitting means), the connection element does not have to be reworked in order to achieve the surface quality required for surgical instruments/devices. This results in process-reliable/reproducible machinability, simplification of assembly by increasing the degree of mechanization during manufacture, and better cleaning properties.

DETAILED DESCRIPTION

Preferred embodiments of the present disclosure are described below based on the accompanying Figures.

FIGS. 1 to 7 show perspective views of a section of a screwdriving tool 1 according to the application at different times of an assembly method carried out with it. The screwdriving tool 1 is used to screw a screw 2 having an external thread into an internal thread. The internal thread is configured on a surgical instrument 3 in the embodiments shown. In the embodiments shown, the screw 2 fixes two components of the instrument 3 here so as to be movable relative to each other, in particular pivotably.

The screwdriving tool 1 has a first tool shaft 4, which has a large shaft diameter, and a second tool shaft 5, which has a small shaft diameter. The shaft diameter of the first tool shaft 4 is thus larger than the shaft diameter of the second tool shaft 5. Preferably, the large shaft diameter corresponds approximately to a diameter of a screw head 6 of the screw 2, while the small shaft diameter preferably corresponds approximately to a diameter of a screw shaft 7 or a core diameter of the screw 2 (or is slightly smaller).

The first tool shaft 4 has an end-side screw engagement portion 8 which is provided and configured for transmitting a torque to the screw 2, in particular the screw head 7. The screw engagement portion 8 may preferably correspond to a shape of the screw head 7 and in particular have a concavely curved surface. The concavely curved surface may preferably be spherical, even if this is not explicitly shown in the Figures. The second tool shaft 5 is aligned axially to the first tool shaft 4 and in the opposite direction to it. The first tool shaft 4 and the second tool shaft 5 thus have a common longitudinal axis and are axially spaced apart. The second tool shaft 5 is oriented such that its end-side screw engagement portion 9 is axially opposite the end-side screw engagement portion 8 of the first tool shaft 4 and is provided and configured to transmit a compression force axially toward the first tool shaft 4 to the screw 2. That is, the screw 2 can be or is axially arranged between the first tool shaft 4 and the second tool shaft 5. The screw 2 can be clamped axially between the first tool shaft 4 and the second tool shaft 5. In the clamped state (cf. FIGS. 1 to 4), the screw head 6 is in contact with the screw engagement portion 8 and the screw shaft/a screw end 7 is in contact with the screw engagement portion 9 of the screwdriving tool 1.

The first tool shaft 4 and the second tool shaft 5 may be axially movable relative to each other, preferably pivotably or axially shiftable. For example, the first tool shaft 4 and the second tool shaft 5 may be configured in the manner of a press or in the manner of pliers.

Preferably, the screw engagement portion 8 of the first tool shaft 4 may be spring pre-tensioned in the axial direction toward the second tool shaft 5, even if this is not shown. Preferably, the screw engagement portion 9 of the second tool shaft 5 may be spring pre-tensioned in the axial direction toward the first tool shaft 4, even if this is not shown. For example, the first tool shaft may be integrally connected to the second tool shaft rotatably, i.e., in a rotationally coupled manner, about its longitudinal axis. Alternatively, the first tool shaft 4 may be relatively rotatable relative to the second tool shaft 5 about its longitudinal axis.

Figure 1:
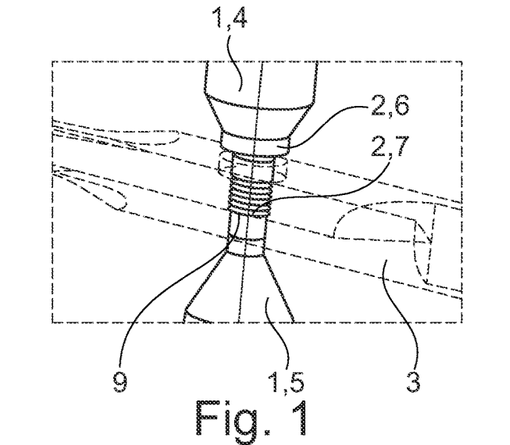
FIGS. 1 to 4 show perspective views of a section of a screwdriving tool according to the application at different times of an assembly method carried out with it.
Figure 2:
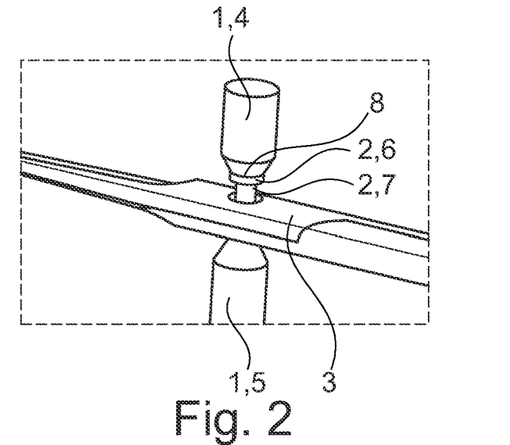
Figure 3:
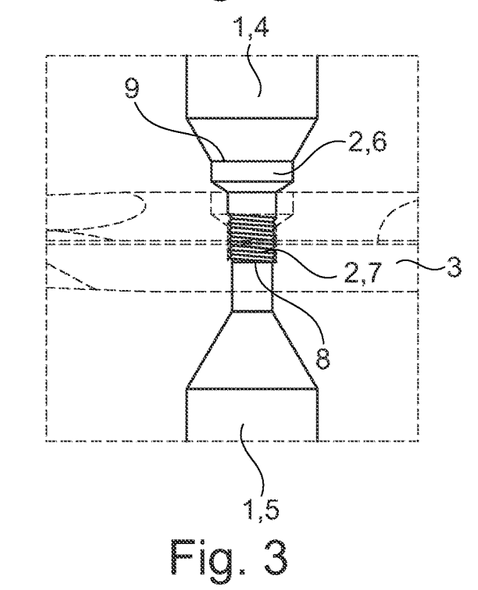
Figure 4:
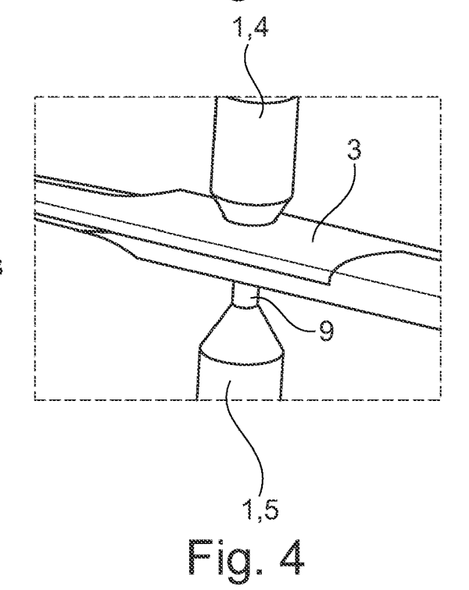
Figure 5:
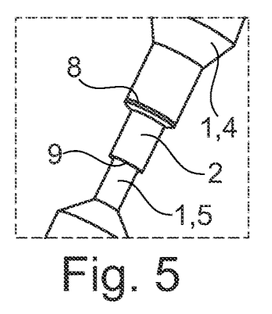
FIGS. 5 to 7 show further perspective views of the screwdriving tool at different times during the assembly method carried out with it.
Figure 6:
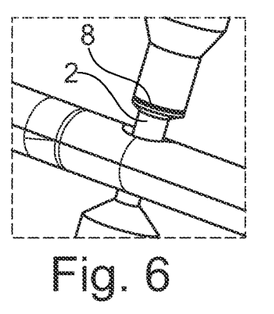
Figure 7:
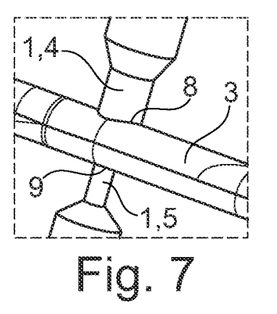

FIG. 5 shows the described cutting tool 1 in which the screw 2 is clamped between the two tool shafts 4, 5, without showing the instrument 3 in which the screw 2 is/is to be screwed in. FIG. 6 corresponds essentially to FIG. 2, in which a state during screwing in of the screw 2 is shown, while FIG. 7 corresponds substantially to FIG. 4, in which a state with screw 2 screwed in is shown.

Figure 8:
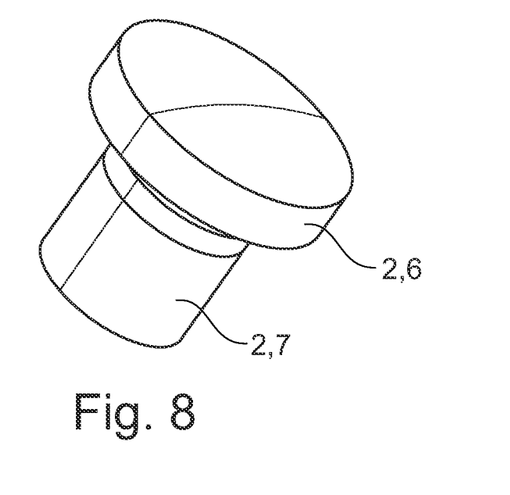
FIGS. 8 and 9 show perspective views of a screw that can be screwed in with the screwdriving tool and of an instrument into which the screw is screwed.

FIG. 8 shows a perspective view of the screw 2 in a first preferred embodiment. The screw head 6 of the screw 2 or its surface is convexly curved. In particular, the screw head 6 may be substantially rotationally symmetrical, for example spherically configured. In this embodiment, the screw head 6 has no form-fit engagement surfaces.

Figure 9:
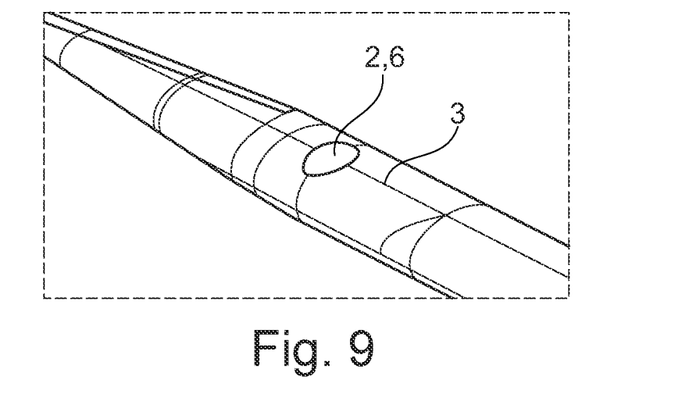

FIG. 9 shows a perspective view of the instrument 3 with the screw 2 screwed into it in the first preferred embodiment. Due to the convex curvature and the circular design of the screw head 6, there are no gaps or pockets in which dirt, tissue residues or liquids could collect.

Figure 10:
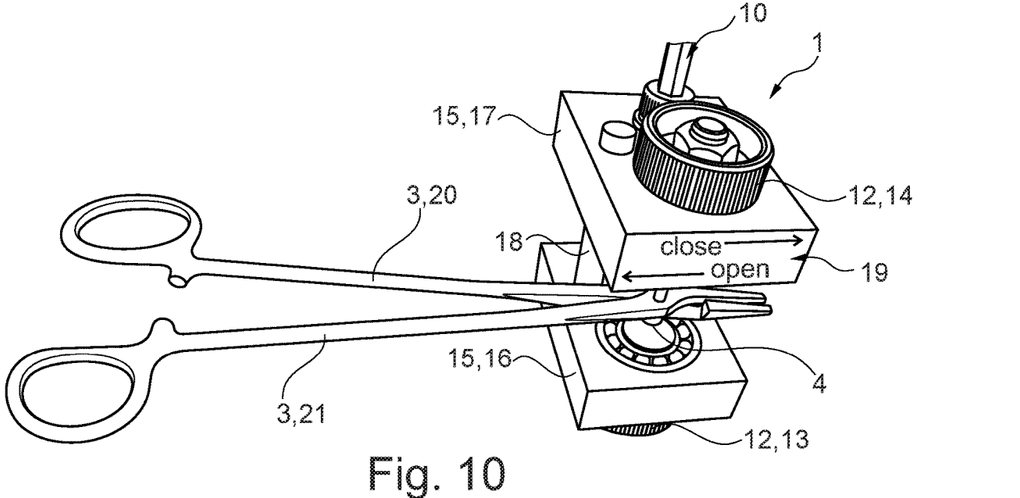
FIGS. 10 to 12 show perspective views of the screwdriving tool with two axially extending tool shafts and a (screw clamp-like) tool shaft support/holding frame.
Figure 11:
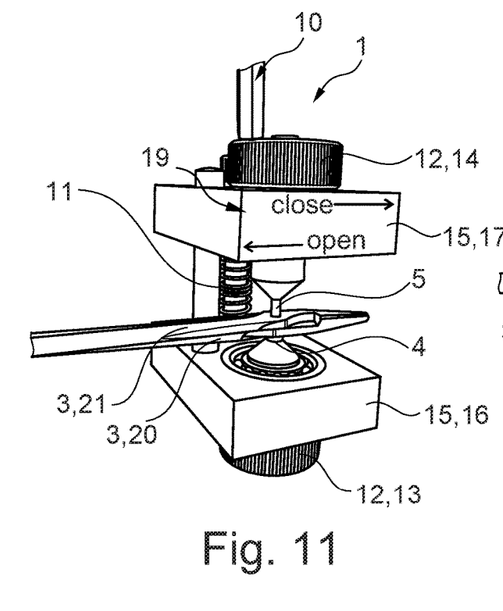
Figure 12:
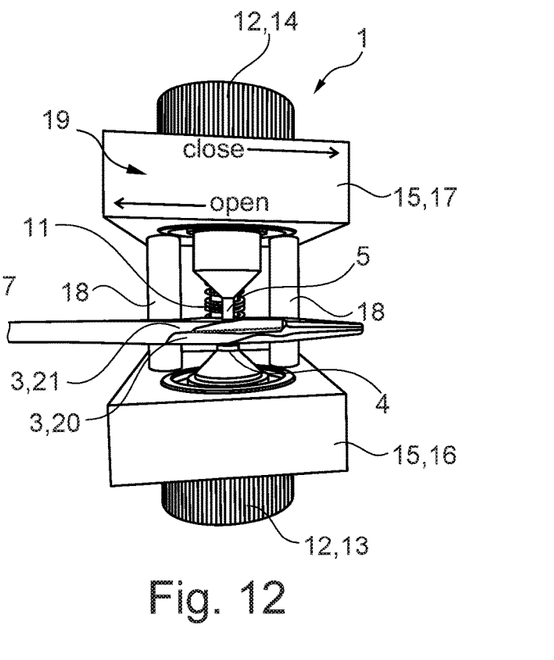

FIGS. 10 to 12 show perspective views of the screwdriving tool 1. The screwdriving tool 1 may additionally comprise a compression force device 10. The compression force device 10 is provided and configured to set, calculate and/or measure the compression force (from the second tool shaft 5 axially toward the first tool shaft 4 on the screw 2 or from the first tool shaft 4 axially toward the second tool shaft 5 on the screw 2). In other words, the compression force device 10 is provided and configured to set, calculate and/or measure an axial clamping force of the screwdriving tool 1 acting on the screw 2. In particular, the compression force device 10 is configured such that an axial distance between the first tool shaft 4 and the second tool shaft 5 is changeable/adjustable, for example via a screw drive. Thus, the axial clamping force/axial compression force can be determined depending on the length of the screw 2 to be clamped in the screwdriving tool 1. Preferably, the compression force device 10 may have a tension spring 11, against whose restoring force the axial distance between the first tool shaft 4 and the second tool shaft 5 can be changed, in the illustrated embodiment reduced. The compression force device 10 may be actuated manually or preferably automatically.

The screwdriving tool 1 may additionally comprise a tightening device 12. The tightening device 12 is provided and configured to set and/or measure a rotation angle and/or the torque of the screw engagement portion 8 of the first tool shaft 4 and/or of the screw engagement portion 9 of the second tool shaft 5. The tightening device 12 can be manually or preferably automatically actuatable. For setting a defined screw-in depth of the screw 2, which is also referred to as setting a turn of the thread, and/or for setting a defined tightening torque with which the screw 2 is screwed in, the torque transmitted to the screw 2 by the screwdriving tool 1, for example in the manner of a torque wrench, and/or the angle of rotation transmitted to the screw 2 by the screwdriving tool 1, for example in the manner of an angle of rotation meter, can be set and measured with the tightening device 12. In this way, it is possible to set how far the screw 2 is screwed in, i.e. which turn of the thread of the screw 2 is engaged.

In the embodiment shown, the tightening device 12 has a first tightening wheel 13 that is connected to the first tool shaft 4 in a rotationally fixed manner. If the screw 2 is clamped in the screwdriving tool 1 and the first tightening wheel 13 is rotated relative to the instrument 3, the screw 2 is screwed into the instrument 3 with the friction torque resulting from the axial compression force. In the embodiment shown, the tightening device 12 has a second tightening wheel 14 that is connected to the second tool shaft 5 in a rotationally fixed manner. When the screw 2 is clamped in the screwdriving tool 1 and the second tightening wheel 14 is rotated relative to the instrument 3, the screw 2 is screwed into the instrument 3 with the friction torque resulting from the axial compression force. The maximum friction torque that can be transmitted can be increased by rotating the two tightening wheels 13, 14. The two tightening wheels 13, 14 can be rotated/driven integrally with each other or can be rotated/driven separately/individually from each other. Alternatively, only one tightening wheel may be provided, so that the first tool shaft 4 is also rotated relative to the second tool shaft 5 when it is rotated relative to the instrument (and the second tool shaft 5 serves only as a counter-holder for applying the axial compression force).

The screwdriving tool 1 may have a holder 15 to which the first tool shaft 4 and/or the second tool shaft 5 are attached. In the embodiment shown, the holder 15 has a first receptacle 16 on which the first tool shaft 4 is rotatably mounted and a second receptacle 17 on which the second tool shaft 5 is rotatably mounted. An axial distance between the two receptacles 16, 17 is adjustable via the compression force device 10. The holder 15 has an axial guide 18, here in the form of two rods aligned parallel to the axis of rotation, by which an adjustment of the axial distance parallel to the axis of rotation is guided. A scale 19 is configured on the holder 15, which indicates a clockwise or counterclockwise direction (closing or opening) of the screwdriving tool 1.

As can be seen from FIG. 10, the screwdriving tool 1 according to the invention is used to screw the screw 2 into the internal thread of the instrument 3, which has two branches 20, 21, in order to connect the two branches 20, 21 of the instrument 3 in such a way that the two branches 18, 19 are pivotable to each other. In this case, the setting depth of the screw 2 or the turn of the thread of the screw 2 can be used to set the magnitude of a section modulus of the two branches 20, 21 of the instrument 3 that are thereby movably/pivotably connected to each other, the section modulus resulting from the screw connection. Preferably, the first branch 20 of the two branches 20, 21 has a first through-hole. Preferably, the second branch 21 of the two branches 20, 21 has a second through-hole at which the internal thread is configured. In particular, the first through-hole is smaller than a diameter of the screw head 6, so that the two branches 20, 21 can be pivotably fixed to each other by the screw head 6 axially abutting the first through-hole, and the screw shaft 7 engaging through the first through-hole and into the internal thread in the second through-hole.

The present disclosure also relates to an assembly method for screwing the screw 2 into the internal thread of the instrument 3 comprising the two branches 20, 21, in order to connect the two branches 20, 21 of the instrument 3 so that they are pivotable to each other. In a step of the assembly method, the first tool shaft 4 and the second tool shaft 5 are moved axially toward each other to clamp the screw 2 between its screw head 6 and its screw shaft 7 in the screwdriving tool 1 such that a compression force is transmitted axially from the second tool shaft 5 toward the first tool shaft 4 to the screw 2 (and from the first tool shaft 4 toward the second tool shaft to the screw 2). The screw engagement portion 8 of the first tool shaft 4 is preferably moved so that it is in contact with the screw head over an entire screw head surface. The screw engagement portion 9 of the second tool shaft 5 is preferably moved so that it is in contact with the screw shaft 7 over its entire (axial) surface.

In a downstream step of the assembly method, the screwdriving tool 1, in particular the first tool shaft 4 and preferably the second tool shaft 5, is rotated relative to the instrument 3 about a longitudinal screw axis of the screw 2 in order to transmit a torque, in particular for setting a tightening torque or a screw-in depth of the screw 2, to the screw 2 clamped in the screwdriving tool 1 and to screw the screw 2 into the internal thread. When the screw 2 is clamped between the two screw engagement portions 8, 9, the torque can be transmitted to the screw 2 in a frictionally engaged manner via the screw engagement portion 8 of the first tool shaft 4 by rotating the screw engagement portion 8 of the first tool shaft 4 about the longitudinal screw axis to generate a friction torque. The screw engagement portion 9 of the second tool shaft 5 can co-rotate/also be rotated to increase the friction torque or stand still (relative to the instrument 3) for pure application of the axial (counter) compression force. In particular, the screwdriving tool 1 is moved in a helical motion to screw in the screw 2. Preferably, the screw 2 is screwed into the instrument 3 until the edge of the surface of the screw head 6 and/or of the screw shaft 7, depending on the instrument surface, is preferably completely, but at least partially, flush with a surface of the instrument 3.

In a subsequent step of the assembly method, the first tool shaft 4 and the second tool shaft 5 are moved apart axially to unclamp the screw 2 from the screwdriving tool 1.

Preferably, the second tool shaft 5 can be moved toward the first tool shaft 4 and passed through the second through-hole (in the second branch 21 comprising the internal thread) before the screw 2 is clamped in the screwdriving tool 1 and inserted in the internal thread. The second tool shaft 5 is thus first passed through the instrument 3 ('from below', i.e. an end of the instrument 3 opposite the screw head 6) before the screw 2 is clamped in the screwdriving tool 1, then inserted into the internal thread in the clamped state and screwed into the internal thread by torque transmission. In particular, the second through-hole is larger than the second tool shaft 5 so that the second tool shaft can be guided through the second through-hole from below for clamping the screw 2.

Alternatively, the screw can first be passed through the first through-hole in the first branch 20 and can be inserted into the internal thread in the second branch 21 before the second tool shaft 5 is moved axially through the second through-hole toward the first tool shaft 4 and the screw 2 is clamped in the screwdriving tool 1. Accordingly, the screw 2 is first inserted into the internal thread 'from above', i.e. from an end of the instrument 3 close to the screw head 6, before the first tool shaft 4 and the second tool shaft 5 are moved toward each other to clamp the screw 2. In particular, the second through-hole is larger than the second tool shaft 5 to allow the second tool shaft to pass through the second through-hole from below to clamp the screw 2. The screw 2 can preferably be rotated about the longitudinal screw direction, i.e., for example, manually screwed in slightly/by a few revolutions, before the screw 2 is clamped.

Preferably, the screw 2 can be secured in its screwed-in position by laser welding and/or by adhesive applied before clamping in the screwdriving tool 1.

The invention claimed is:

1. A screwdriving tool for screwing a screw in particular into an internal thread of a medical instrument, comprising:
 a first tool shaft preferably having a large shaft diameter and an end-side screw engagement portion which is provided and configured for transmitting a torque to the screw, the screw engagement portion of the first tool shaft having a spherical surface,
 a second tool shaft which preferably has a small shaft diameter and is orientable or oriented axially to the first tool shaft and in the opposite direction thereto such that its end-side screw engagement portion is axially opposite to the end-side screw engagement portion of the first tool shaft, and is provided and configured to transmit a compression force axially to the screw in the direction of the first tool shaft, the screw engagement portion of the second tool shaft having a spherical surface, and
 a screw provided and configured to receive, from the screw engagement portion of the first tool shaft, the torque and the compression force from the screw engagement portion of the second tool shaft and wherein the screw has a spherical and unprofiled screw head.

2. The screwdriving tool according to claim 1, wherein the screw engagement portion of the first tool shaft and/or of the second tool shaft have/has a concavely curved surface, in particular a substantially spherical or frustoconical surface.

3. The screwdriving tool according to claim 1, further comprising a tightening device provided and configured to set and/or measure a rotation angle and/or torque of the screw engagement portion of the first tool shaft and/or of the second tool shaft.

4. The screwdriving tool according to claim 1, further comprising a compression force device which is provided and configured to set, calculate and/or measure the compression force.

5. The screwdriving tool according to claim 1, wherein the first tool shaft and the second tool shaft are held axially movable, for example, axially pivotable or axially shiftable, relative to each other.

6. The screwdriving tool according to claim 1, wherein the screw engagement portion of the first tool shaft is spring pre-tensioned in an axial direction toward the second tool shaft, and/or the screw engagement portion of the second tool shaft is spring pre-tensioned in the axial direction toward the first tool shaft.

7. The screwdriving tool according to claim 1, wherein the first tool shaft is integrally connected to the second tool shaft in a rotationally coupled manner about its longitudinal axis.

8. The screwdriving tool according to claim 1, wherein the first tool shaft is relatively rotatable relative to the second tool shaft about its longitudinal axis.

\* \* \* \* \*